Feb. 3, 1959   G. HALLEWELL   2,871,683
FLEXIBLE COUPLINGS
Filed June 17, 1957
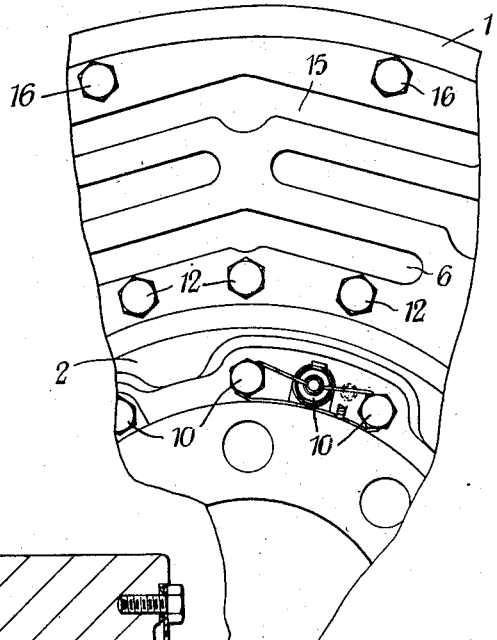
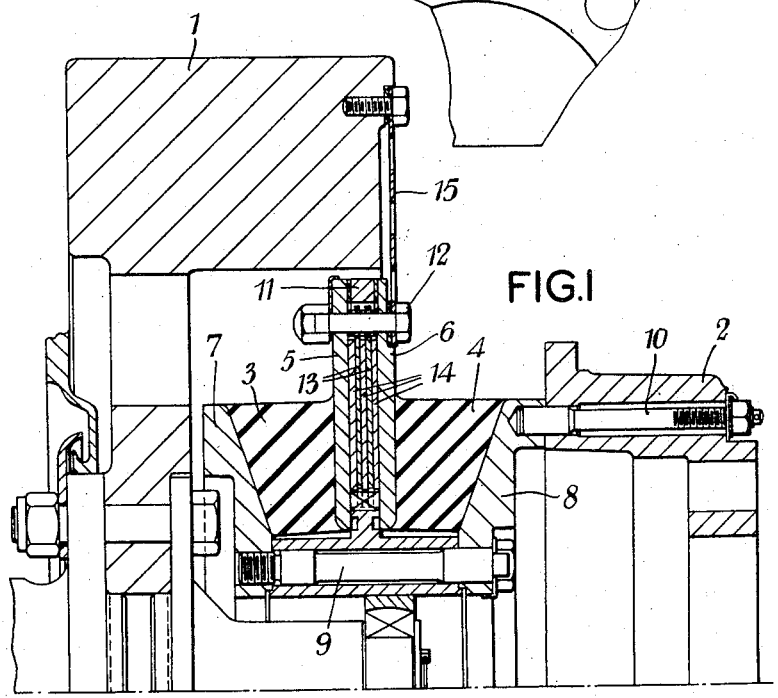
INVENTOR
GEORGE HALLEWELL
BY

United States Patent Office 2,871,683
Patented Feb. 3, 1959

2,871,683

FLEXIBLE COUPLINGS

George Hallewell, Stamford, England, assignor to Blackstone and Company Limited, Stamford, England Application June 17, 1957, Serial No. 665,980

Claims priority, application Great Britain June 25, 1956

2 Claims. (Cl. 64—13)

This invention concerns flexible couplings for use in the transmission of power to a driven unit.

In our Patent No. 2,709,903 we have described and claimed a flexible coupling which provides a degree of torsional flexibility and (optionally) torsional damping. This form of coupling, however, makes virtually no provision for conical flexibility (that is to say allowance for misalignment between driving and driven shafts).

It is the object of the present invention to provide a coupling which will confer upon a driving connection a degree of torsional flexibility, torsional damping and conical flexibility.

With this object in view the invention provides a flexible coupling comprised by a pair of annular members made of resilient material such as rubber, each of which is bonded on one surface to an annular plate attached to and lying transversely to a driving member and is bonded on its other surface to an annular member attached to and lying transversely to a driven member, a frictional or hydraulic damper being housed between the annular plates and the attachment of the one annular plate to the driving member being made by a ring flexible axially and fixed adjacent its inner circumference to the outer part of the plate and fixed adjacent its outer circumference to a flange on the driving member of greater diameter than the plate.

The flexible ring is conveniently comprised by an arcuately slotted spring steel plate which is bolted to the annular plate of the coupling and the flange on the driving member.

The flange on the driving member may be the rim of a flywheel attached to the crankshaft of an I. C. engine or the output shaft of any other prime mover.

The above and other parts of the invention are embodied in a preferred constructional form of coupling which will now be described by way of example with reference to the accompanying drawings in which:

Fig. 1 is a central vertical section through a complete coupling,

Fig. 2 is a partial end elevation of a slotted plate used in the construction of the coupling of Fig. 1.

The coupling is in most respects similar to that described and illustrated in our above mentioned Patent No. 2,709,903.

The rim 1 of a flywheel of an I. C. engine constitutes a driving member for a driven shaft 2 aligned as accurately as practicable with the axis of the engine crankshaft.

The actual coupling is comprised by a pair of similar annular members 3, 4 of resilient material lying substantially normal to the axis of the driving and driven shafts each of which is bonded on an inner surface to an annular plate 5, 6 drivingly connected to the flywheel 1 and on its outer surface to an annular plate 7, 8 attached to the driven shaft by bolts 9 and 10. The two annular plates 5, 6 are of greater diameter than the resilient members 3, 4 and serve with an annular cover ring 11 and a series of bolts 12 to anchor and house a series of friction discs 13 interleaved between discs 14 keyed to the driven shaft.

The annular plate 6 is connected to the driving member 1 through the medium of an arcuately slotted spring steel plate 15 of ring form by two series of bolts 12 and 16, one near the inner circumference of the ring and the other near the outer circumference of the ring.

It is desirable to give the flexible ring a substantial radial width, to provide effective axial flexibility while maintaining circumferential strength. In order to achieve this the resilient annular members may be of less proportional diameter and of greater proportional width than those shown in our Patent No. 2,709,903.

In operation the coupling not only provides a degree of conical flexibility but also permits a degree of misplacement of driving and driven shafts along their axes.

It will be understood that the invention is not restricted to the details of the specific embodiment described which may be varied without departing from the scope of the following claims.

I claim:

1. Flexible coupling means for connecting a driving member to a driven member even when these members are misaligned, comprising driving plate means, a pair of annular members of a resilient material bonded to either side of said plate means, a pair of annular plates attached to the driven member, each plate being bonded to the outer surface of one of said annular members, and flexible means connected to said driving plate means and connectable to a driving member even when said plate means is misaligned with the driving member, said flexible means including a ring flexible axially and fixed adjacent its inner circumference to the outer part of said driving plate means and having means adjacent its outer circumference for connection to a portion on the driving member of greater diameter than the plate means.

2. The device of claim 1 wherein said flexible ring is an arcuately slotted spring steel plate, and is attached by a concentric series of bolts to the annular plate and said portion of the driving member.

References Cited in the file of this patent

UNITED STATES PATENTS

| 1,460,212 | Olive | June 26, 1923 |
| 1,479,034 | Fernow | Jan. 1, 1924 |
| 2,709,903 | Hallewell | June 7, 1955 |

FOREIGN PATENTS

| 1,021,778 | France | Dec. 3, 1952 |